US009515332B2

(12) United States Patent
Lee et al.

(10) Patent No.: US 9,515,332 B2
(45) Date of Patent: Dec. 6, 2016

(54) FUEL CELL STACK INCLUDING EJECTOR AND BLOWER FOR ANODE RECIRCULATION AND METHOD FOR CONTROLLING THE SAME

(71) Applicant: Hyundai Motor Company, Seoul (KR)

(72) Inventors: Hyun Joon Lee, Gyeonggi-do (KR); Yong Gyu Noh, Gyeonggi-do (KR); Bu Kil Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 323 days.

(21) Appl. No.: 14/224,746

(22) Filed: Mar. 25, 2014

(65) Prior Publication Data
US 2014/0205920 A1    Jul. 24, 2014

Related U.S. Application Data

(62) Division of application No. 12/960,812, filed on Dec. 6, 2010, now Pat. No. 8,709,669.

(30) Foreign Application Priority Data

Jul. 30, 2010   (KR) .................. 10-2010-0074234

(51) Int. Cl.
*H01M 8/04* (2016.01)
*H01M 8/06* (2016.01)
*H01M 8/10* (2016.01)

(52) U.S. Cl.
CPC ....... *H01M 8/04097* (2013.01); *H01M 8/0432* (2013.01); *H01M 8/0438* (2013.01); CPC ..... *H01M8/04462* (2013.01); *H01M 8/04753* (2013.01); *H01M 2008/1095* (2013.01); *H01M 2250/20* (2013.01); *Y02E 60/50* (2013.01); *Y02T 90/32* (2013.01)

(58) Field of Classification Search
CPC ......... H01M 8/04097; H01M 8/0432; H01M 8/0438; H01M 8/04462; H01M 8/04753
USPC ........................................ 429/410, 414, 415
See application file for complete search history.

(56) References Cited

U.S. PATENT DOCUMENTS

2003/0096145 A1   5/2003 Sugawara et al.
2003/0148167 A1   8/2003 Sugawara et al.
(Continued)

FOREIGN PATENT DOCUMENTS

EP       2 075 866 A1     7/2009

OTHER PUBLICATIONS

Ahluwalia, R. et al., "Fuel Cell Systems for Transportation: Status and Trends," Jrl. of Power Sources, 177, pp. 167-176 (2008).

*Primary Examiner* — Sean P Cullen
(74) *Attorney, Agent, or Firm* — Mintz Levin Cohn Ferris Glovsky and Popeo, P.C.; Peter F. Corless

(57) ABSTRACT

The present invention relates to a fuel cell system for vehicles and a method for controlling the same which stably maintains an output of a fuel cell by precisely estimating a recirculated hydrogen amount to a stack. A fuel cell system according to the present invention may include: a stack comprising a plurality of unit cells for generating electrical energy by electrochemical reaction of a fuel and an oxidizing agent; a blower for recirculating a gas exhausted from the stack so as to supply the gas back to the stack; an ejector for recirculating the gas exhausted from the stack, receiving hydrogen so as to mix the hydrogen to the recirculated gas, and supplying the mixture to the stack; a sensor module for detecting a driving condition of the vehicle; and a control portion for controlling operations of the blower and the ejector by using the driving condition of the vehicle and performance maps of the blower and the ejector.

4 Claims, 6 Drawing Sheets

(56) References Cited

U.S. PATENT DOCUMENTS

| | | | |
|---|---|---|---|
| 2006/0073363 A1* | 4/2006 | Taniguchi | H01M 8/04082 429/429 |
| 2006/0121326 A1 | 6/2006 | Hiramatsu et al. | |
| 2007/0196709 A1 | 8/2007 | Umayahara et al. | |
| 2008/0233445 A1* | 9/2008 | Nakayama | H01M 8/04097 429/449 |
| 2009/0325004 A1 | 12/2009 | Choi et al. | |
| 2010/0178578 A1* | 7/2010 | Milacic | H01M 8/04097 429/439 |

* cited by examiner

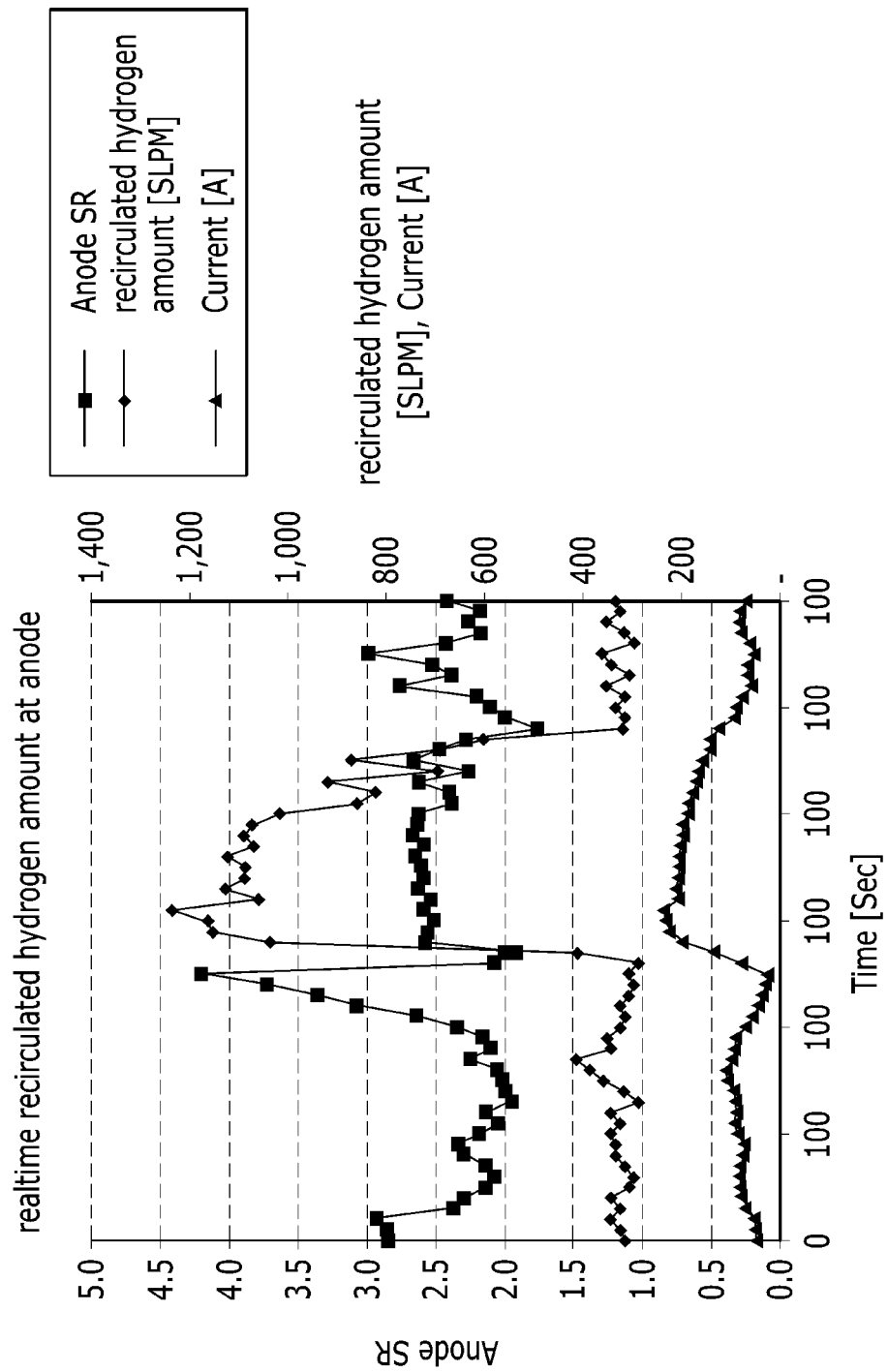

FUEL CELL STACK INCLUDING EJECTOR AND BLOWER FOR ANODE RECIRCULATION AND METHOD FOR CONTROLLING THE SAME

CROSS-REFERENCE TO RELATED APPLICATION

This application is a divisional application from U.S. patent application Ser. No. 12/960,812 filed on Dec. 6, 2010, issued as U.S. Pat. No. 8,709,669 and claims priority to and the benefit of Korean Patent Application No. 10-2010-0074234 filed in the Korean Intellectual Property Office on Jul. 30, 2010, the entire contents of which are incorporated herein by reference.

BACKGROUND OF THE INVENTION (a) Field of the Invention

The present invention generally relates to a fuel cell system for vehicles and a method for controlling the same. More particularly, the present invention relates to a fuel cell system for vehicles and a method for controlling the same which stably maintains an output of a fuel cell by precisely estimating a recirculated hydrogen amount to a fuel cell stack.

(b) Description of the Related Art

A fuel cell system is a well known type of electric generator system which converts chemical energy of a fuel directly into electrical energy.

The fuel cell system includes a fuel cell stack for generating electrical energy, a fuel supply for supplying a fuel (that is, hydrogen) to the fuel cell stack, an air supply for supplying oxygen in air (which is an oxidizing agent for the electrochemical reaction) to the fuel cell stack, and a device for managing heat and water for radiating reaction heat of the fuel cell stack to an exterior of the system and controlling operating temperature of the fuel cell stack.

Therefore, the fuel cell system generates electricity by an electrochemical reaction of the hydrogen, which is the fuel, and the oxygen in the air, and exhausts heat and water which are by-product of the reaction.

The fuel cell stack as applied to a fuel cell vehicle includes a plurality of unit batteries arranged sequentially. Each unit battery includes a membrane-electrode assembly (MEA) disposed at the innermost part thereof, and the membrane-electrode assembly includes an electrolyte membrane for transferring hydrogen ions, and catalytic layer. In particular, a cathode and an anode are spread at both sides of the electrolyte membrane so as to react the hydrogen with the oxygen. In addition, a gas diffusion layer (GDL) is positioned at an exterior portion of the membrane-electrode assembly (MEA). In particular, a GDL Is positioned at the exterior portion in which the cathode and the anode are positioned. Further, a separator is positioned at an exterior of the gas diffusion layer. The separator is formed of a flow field for supplying the fuel and the air to the cathode and the anode and for exhausting water generated by the reaction.

Thus, in a fuel cell, the hydrogen and the oxygen are ionized by a chemical reaction at each catalytic layer such that the hydrogen undergoes an oxidation reaction so as to generate hydrogen ions and electrons, and oxygen ions undergo a reduction reaction with the hydrogen ions so as to generate water. In particular, since the hydrogen is supplied to the anode (which is also referred to as an "oxidation electrode") and the oxygen (or air) is supplied to the cathode (which is also referred to as a "reduction electrode"), the hydrogen supplied to the anode is ionized into hydrogen ions (H+) and electrons (e−) by the catalyst of the electrode layer formed at both sides of the electrolyte membrane. After that, only the hydrogen ions selectively pass through the electrolyte membrane, which is a cation-exchange membrane, and is transferred to the cathode. Simultaneously, the electrons (e−) are transferred to the cathode through the gas diffusion layer and the separator, which are conductors.

Therefore, the hydrogen ions supplied to the cathode through the electrolyte membrane and the electrons supplied to the cathode by the separator react with the oxygen in the air supplied to the cathode by an air supply so as to generate water.

At this time, movement of the hydrogen ions causes electrons to flow through an exterior conducting wire thereby generating current. When the water is generated by the reaction, heat is also generated.

In order to apply such a fuel cell system to the vehicle, it is important to maintain an output of the stack stably, and for this purpose the amount of recirculated hydrogen provided to the stack should be precisely detected or estimated.

However, since a gas recirculated in a fuel cell vehicle has a high water content, and since the gas passes through a short recirculation passage, it is difficult to directly detect the recirculated hydrogen amount by means of a flowmeter.

Therefore, the recirculated hydrogen amount has been typically estimated by using a thermal equilibrium equation. According to the thermal equilibrium equation, heat acquired from the supplied hydrogen is the same as heat lost by the recirculated gas. According to this thermal equilibrium equation, if the detected values (e.g., temperature, pressure, hydrogen concentration, and so on) are precise, a reliable recirculated hydrogen amount may be calculated.

However, the prediction of recirculated hydrogen amount using the thermal equilibrium equation depends greatly on temperatures. In particular, the prediction of the recirculated hydrogen amount using the thermal equilibrium equation is precise when equilibrium temperature is reached. However, the time required to reach equilibrium temperature is very long in an actual system. Therefore, a method for predicting the recirculated hydrogen amount by using the thermal equilibrium equation cannot be applied to an actual system.

In addition, since various heat generations/losses, such as heat generated by a blower, expansion heat of the hydrogen, condensation heat of mixed gas, and heat loss in the line, exist in an actual system, taking these effects into consideration makes the calculation very complex.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a fuel cell system for vehicles and a method for controlling the same having advantages of maintaining a constant output of a stack by precisely predicting a recirculated hydrogen amount and maintaining the recirculated hydrogen amount to be larger than a predetermined hydrogen amount.

A fuel cell system for vehicles according to one embodiment of the present invention may include: a stack made up of a plurality of unit cells for generating electrical energy by electrochemical reaction of a fuel and an oxidizing agent; a blower for recirculating a gas exhausted from the stack so as to supply the gas back to the stack; an ejector for recirculating the gas exhausted from the stack, receiving hydrogen so as to mix the hydrogen with the recirculated gas, and supplying the mixture to the stack; a sensor module for detecting a driving condition of the vehicle; and a control portion for controlling operations of the blower and the ejector by using the driving condition of the vehicle and performance maps of the blower and the ejector.

According to various embodiments, a recirculated hydrogen amount according to a pressure difference between an inlet and an outlet of the stack and a blower RPM may be stored in the performance map of the blower. Further, a recirculated hydrogen amount according to the pressure difference between the inlet and the outlet of the stack and a hydrogen amount supplied to the ejector may be stored in the performance map of the ejector.

In various embodiments, the fuel cell system may further include a purge valve for discharging impurities in the stack. The control portion may be further configured to calculate hydrogen concentration according to the driving condition of the vehicle, and to control the opening and closing of the purge valve according to the calculated hydrogen concentration.

In various embodiments, the fuel cell system may further include a condensed water discharge valve for discharging condensed water in the stack. The control portion may further be configured to calculate a vapor amount according to the driving condition of the vehicle, and to control the opening and closing of the condensed water discharge valve according to the calculated vapor amount.

In some embodiments, the sensor module may include: a first temperature sensor for detecting an inlet temperature of the stack; a second temperature sensor for detecting an outlet temperature of the stack; a first pressure sensor for detecting an inlet pressure of the stack; a second pressure sensor for detecting an outlet pressure of the stack; an RPM sensor for detecting the blower RPM; and an ammeter for detecting a current output from the stack.

According to another embodiment of the present invention, a method is provided for controlling a fuel cell system for vehicles. In particular, the method may include: detecting a driving condition of the vehicle; calculating a recirculated hydrogen amount by using the driving condition of the vehicle and performance maps of the blower and the ejector; calculating a stoichiometric ratio (SR) of the hydrogen in the stack; comparing the SR of the hydrogen in the stack with a predetermined value; and increasing the recirculated hydrogen amount if the SR of the hydrogen in the stack is smaller than the predetermined value.

In some embodiments, the SR of the hydrogen in the stack may be calculated by dividing a sum of the hydrogen amount directly supplied to the stack and the recirculated hydrogen amount supplied to the stack by the hydrogen amount directly supplied to the stack.

The recirculated hydrogen amount may be increased if desired by increasing the hydrogen amount supplied to the ejector and/or by increasing the blower RPM.

In some embodiments, the method for controlling a fuel cell system for vehicles may further include: calculating a hydrogen concentration according to the driving condition of the vehicle; comparing the calculated hydrogen concentration with a predetermined hydrogen concentration; and opening the purge valve if the calculated hydrogen concentration is lower than the predetermined hydrogen concentration.

In some embodiments, the hydrogen concentration according to the driving condition of the vehicle may be predetermined as a function of a purge cycle and a current output.

In some embodiments, the method for controlling a fuel cell system for vehicles may further include: calculating a vapor amount according to the driving condition of the vehicle; comparing the calculated vapor amount with a predetermined vapor amount; and opening the condensed water discharge valve if the calculated vapor amount is larger than the predetermined vapor amount.

In some embodiments, the vapor amount according to the driving condition of the vehicle may be predetermined as a function of an inlet temperature of the stack, an outlet temperature of the stack, an inlet pressure of the stack, and an outlet pressure of the stack.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

FIG. 6 is a graph showing a recirculated hydrogen amount, an anode SR, and a current when a method for controlling a fuel cell system for vehicles according to an exemplary embodiment of the present invention is used.

DETAILED DESCRIPTION OF THE EMBODIMENTS

An exemplary embodiment of the present invention will hereinafter be described in detail with reference to the accompanying drawings.

A fuel cell system according to an exemplary embodiment of the present invention is provided in a fuel cell vehicle and is operated as an electric generator system which generates electrical energy by an electrochemical reaction of a fuel and an oxidizing agent.

If the fuel cell system is a direct oxidation fuel cell, the fuel can include, for example, alcoholic liquid fuel such as methanol and ethanol and hydrocarbon family liquefied gas fuel, the chief ingredients of which are methane, ethane, propane, and butane.

On the other hand, if the fuel cell system is a polymer electrolyte membrane fuel cell, the fuel can include, for example, reforming gas generated from the liquid fuel or liquefied gas fuel by a reformer.

For convenience of explanation, the fuel will be referred to as hydrogen in this specification. Or course, it is understood that the present invention is not limited only to hydrogen fuel, and other known fuels are encompassed by the present invention.

Figure 1:
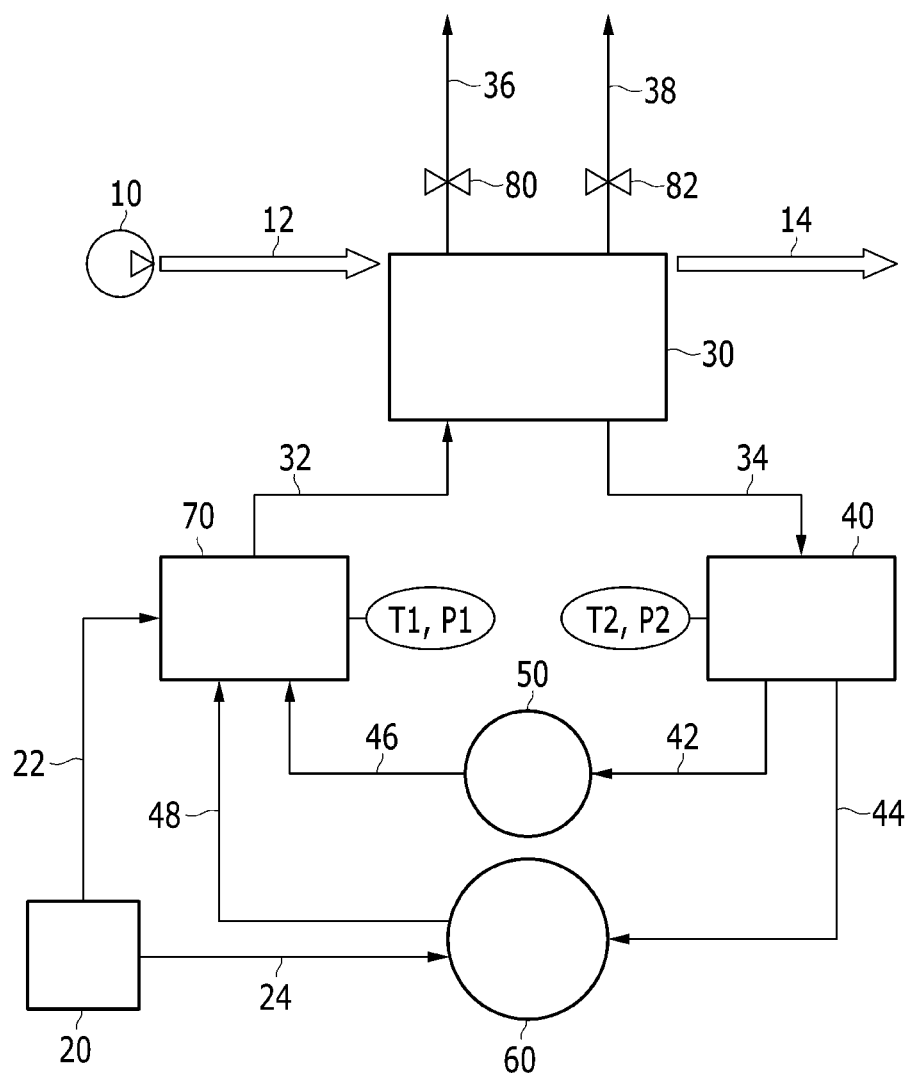
FIG. 1 is a schematic diagram of a fuel cell system for vehicles according to an exemplary embodiment of the present invention.

In addition, according to the exemplary embodiment of the invention, the oxidizing agent may be oxygen gas stored in a special tank or may be natural air. However, as described herein, the oxidizing agent will be referred to as air. Or course, it is understood that the present invention is not limited only to air, and other known oxygen agents are encompassed by the present invention FIG. 1 is a schematic diagram of a fuel cell system for vehicles according to an exemplary embodiment of the present invention. As shown in FIG. 1, the fuel cell system for vehicles according to this embodiment includes a compressor 10, a hydrogen storage 20, a stack 30, an outlet manifold 40, a blower 50, an ejector 60, and a mixing chamber 70.

As shown, the compressor 10 is in connection with the stack 30 through an air supply line 12. The compressor 10 pressurizes air and supplies the air to the stack 30. In addition, in some embodiments, a valve (not shown) for controlling air supply may be provided in the air supply line 12.

Hydrogen is stored in the hydrogen storage 20, and the stored hydrogen can be supplied to the ejector 60 and/or the mixing chamber 70. For example, the hydrogen storage 20 can be in connection with the mixing chamber 70 through a first hydrogen supply line 22, and can also be in connection with the ejector 60 through a second hydrogen supply line 24. Valves (not shown) for controlling hydrogen supply may be further provided in the first and second hydrogen supply lines 22 and 24. In some embodiments, if desired, the hydrogen may be supplied only through one of the supply lines (e.g. only the second hydrogen supply line 24) by removing the other supply line (e.g. by removing the first hydrogen supply line 22), or for example by closing a valve positioned in one of the supply lines.

The stack 30 is made up of a plurality of unit cells 11 sequentially arranged. Each unit cell generates electrical energy through electrochemical reaction of fuel and air. Each unit cell may be a polymer electrolyte membrane fuel cell or a direct oxidation fuel cell according to the fuel used therein.

The unit cell includes a membrane-electrode assembly (MEA)(not shown, and which can be in accordance with any known MEA) and a plurality of separators in contact with and disposed on both sides of the membrane-electrode assembly. In some embodiments, the separator is plate shaped and has conductivity, and is provided with a channel for flowing the fuel and the air to a surface in close contact with the membrane-electrode assembly.

Further, an anode electrode (hereinafter, referred to as an "anode") is provided at one surface of the membrane-electrode assembly, and a cathode electrode (hereinafter, referred to as a "cathode") is provided at the other surface of the membrane-electrode assembly. In addition, an electrolyte membrane is provided between the anode and the cathode.

The anode ionizes the fuel supplied through the channel of the separator into electrons and hydrogen ions by an oxidation reaction, and the electrolyte membrane transports the hydrogen ions to the cathode. The cathode generates water and heat though a reduction reaction between the electrons and the hydrogen ions supplied from the anode, and oxygen in the air supplied through the channel of the separator.

An air exhaust line 14 can further be in connection with the cathode of the stack 30 such that the air going through the chemical reaction is exhausted to the exterior of the vehicle through the air exhaust line 14.

In addition, nitrogen, which is in the air supplied to the cathode of the stack 30, penetrates the electrolyte membrane and passes to the anode, to thereby increase nitrogen concentration in the anode. If the nitrogen concentration in the anode increases to certain levels, diffusion of the hydrogen is hindered. Therefore, it is preferred that nitrogen in the anode be removed.

Further, a portion of the water generated in the cathode by the chemical reaction penetrates the electrolyte membrane and passes to the anode. If the water flowing to the anode remains in a catalytic layer, then the catalyst's reaction capacity is reduced. In addition, if the water flowing to the anode remains in the channel, the path for supplying the hydrogen becomes blocked. Therefore, water in the catalytic layer and the channel of the anode should be removed. In some embodiments, the anode of the stack 30 can be connected to a purge line 36, and a purge valve 80 or the like can be mounted at the purge line 36. The purge valve 80 can be configured to open at certain times, such as every predetermined purge cycle, or as necessary so as to exhaust impurities (i.e., nitrogen and water) in the anode.

In some embodiments, the anode of the stack 30 can be connected to a condensed water exhaust line 38, and a condensed water discharge valve 82 or the like can be mounted at the condensed water exhaust line 38. If the condensed water discharge valve 82 is opened, the water in the catalytic layer and/or the channel of the anode is exhausted. In some embodiments, instead of using an additional condensed water discharge valve 82, the purge valve 80 can also be used as the condensed water discharge valve 82.

As further shown in FIG. 1, the stack 30 is in connection with a recirculation inlet line 32 so as to receive a recirculated gas, and is in connection with a recirculation outlet line 34 so as to exhaust a gas generated by the reaction of the air and the hydrogen in the stack 30.

As shown in FIG. 1, an outlet manifold 40 can be in connection with the stack 30 through a recirculation outlet line 34. Therefore, gas generated at the stack 30 can be gathered in the outlet manifold 40 and recirculated through two paths. In particular, the outlet manifold 40 can be in connection with the blower 50 through a first recirculation line 42, and can be in connection with the ejector 60 through a second recirculation line 44. The outlet manifold 40 is not particularly limited and can be in accordance with any convention design, and is generally configured so as to provide a location at which the gas generated at the stack 30 can gather.

The blower 50, as shown in FIG. 1, can be in connection with the outlet manifold 40 through the first recirculation line 42, and can be in connection with the mixing chamber 70 through a first connecting line 46. As such, the blower 50 can recirculate gas gathered at the outlet manifold 40 and supply the gas to the mixing chamber 70.

As further shown, the ejector 60 is in connection with the outlet manifold 40 through the second recirculation line 44, and is in connection with the mixing chamber 70 through a second connecting line 48. In addition, the ejector 60 can be in connection with the hydrogen storage 20 through the second hydrogen supply line 24. As such, the ejector 60 can recirculate gas gathered at the outlet manifold 40, mix hydrogen with the recirculated gas, and supply the mixture to the mixing chamber 70.

As further shown in FIG. 1, the mixing chamber 70 is in connection with the hydrogen storage 20 through the first hydrogen supply line 22, is in connection with the blower 50 through the first connecting line 46, is in connection with the ejector 60 through the second connecting line 48, and is in connection with the stack 30 through the recirculation inlet line 32. As such, the mixing chamber 70 can mix the hydrogen supplied from the hydrogen storage 20 with the gas recirculated through the blower 50 and the ejector 60, and supply the mixture to the stack 30. The mixing chamber 70 is not particularly limited, and can be in accordance with any conventional mixing chamber, and is generally configured so as to provide a place at which recirculated gas and hydrogen can be mixed.

Figure 2:
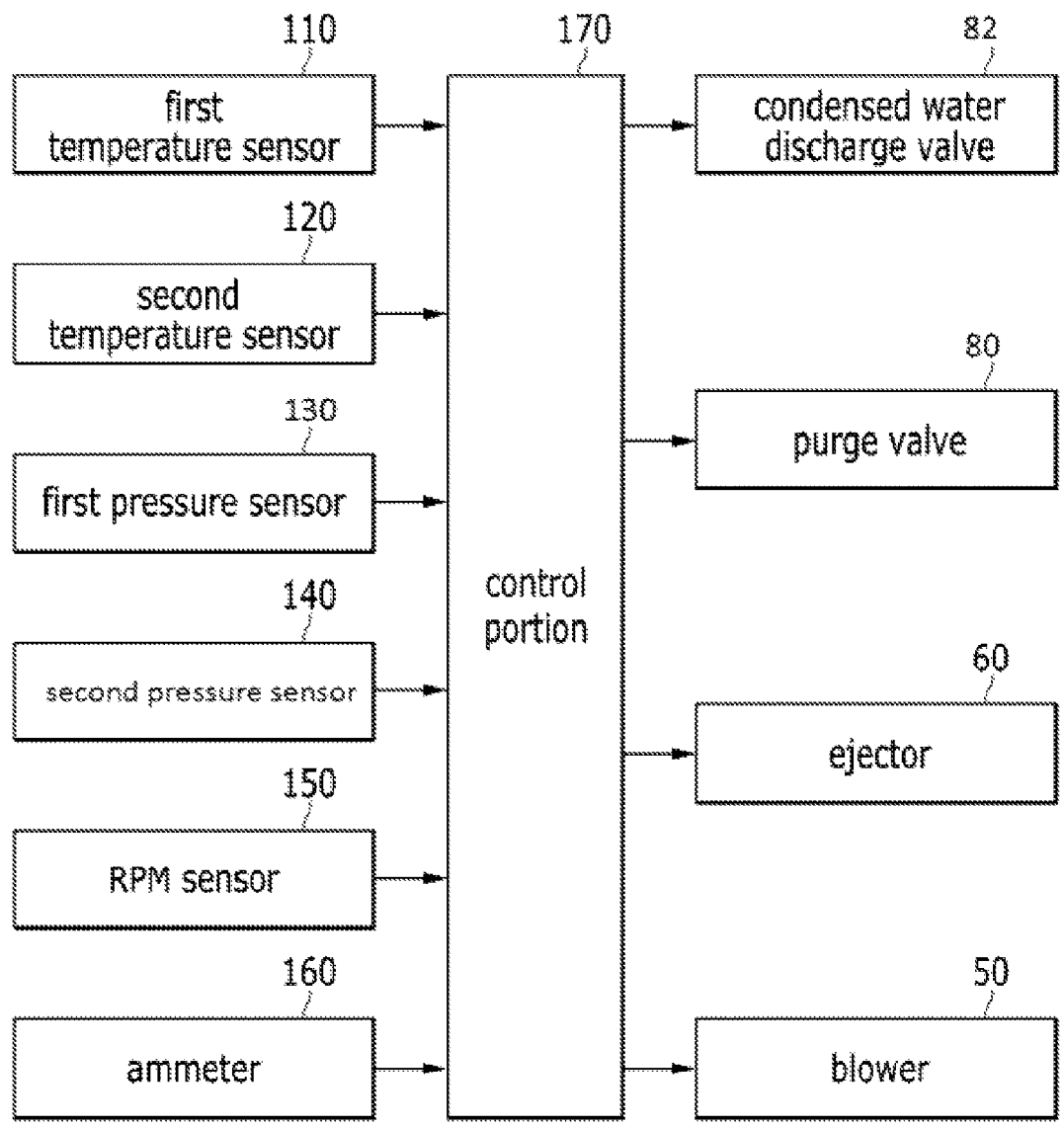
FIG. 2 is a block diagram of a fuel cell system for vehicles according to an exemplary embodiment of the present invention.

As shown, according to the exemplary embodiment of the present invention shown in FIG. 2, the fuel cell system for vehicles further includes a sensor module and a control portion 170.

The sensor module is configured to detect a driving condition of the vehicle, and can include, for example, first and second temperature sensors 110 and 120, first and second pressure sensors 130 and 140, an RPM sensor 150, and an ammeter 160. In addition, a plurality of sensors for detecting the driving condition of the vehicle may be included in the sensor module. However, in the following description, the sensors used in a method for controlling a fuel cell system for vehicles according to an exemplary embodiment of the present invention will be described in further detail.

According to this exemplary embodiment, the first temperature sensor 110 is mounted at the inlet of the stack 30 or the recirculation inlet line 32, and is configured to detect an inlet temperature of the stack 30, and to transmit a signal corresponding thereto to the control portion 170. The second temperature sensor 120 is mounted at the outlet of the stack 30 or the recirculation outlet line 34, and is configured to detect an outlet temperature of the stack 30, and to transmit a signal corresponding thereto to the control portion 170.

Further, according to this exemplary embodiment, the first pressure sensor 130 is mounted at the inlet of the stack 30 or the recirculation inlet line 32, and is configured to detect an inlet pressure of the stack 30, and to transmit a signal corresponding thereto to the control portion 170. The second pressure sensor 140 is mounted at the outlet of the stack 30 or the recirculation outlet line 34, and is configured to detect an outlet pressure of the stack 30, and to transmit a signal corresponding thereto to the control portion 170.

Further, the RPM sensor 150 is configured to detect a rotation speed of the blower 50 (blower RPM), and to transmit a signal corresponding thereto to the control portion 170.

The ammeter 160 is configured to detect the current generated in the stack 30, and to transmit a signal corresponding thereto to the control portion 170. It is noted that the current generated in the stack 30 is almost proportional to an output of the stack 30, and may be a basis for predicting the output of the stack 30 or a load of the vehicle.

As shown, the control portion 170 receives signals corresponding to the driving condition of the vehicle from the sensor modules and controls all of the valves (e.g., condensed water discharge valve 82, purge valve 80, and so on), the ejector 60, and the blower 50. As such, the control portion 170 is electrically in connection with to the sensor module, the valves, the blower 50, and the ejector 60.

Hereinafter, a method for controlling the fuel cell system for vehicles according to the exemplary embodiment of the present invention will be further described in detail in connection with FIG. 3 which is a flowchart of the exemplary method.

Figure 3:
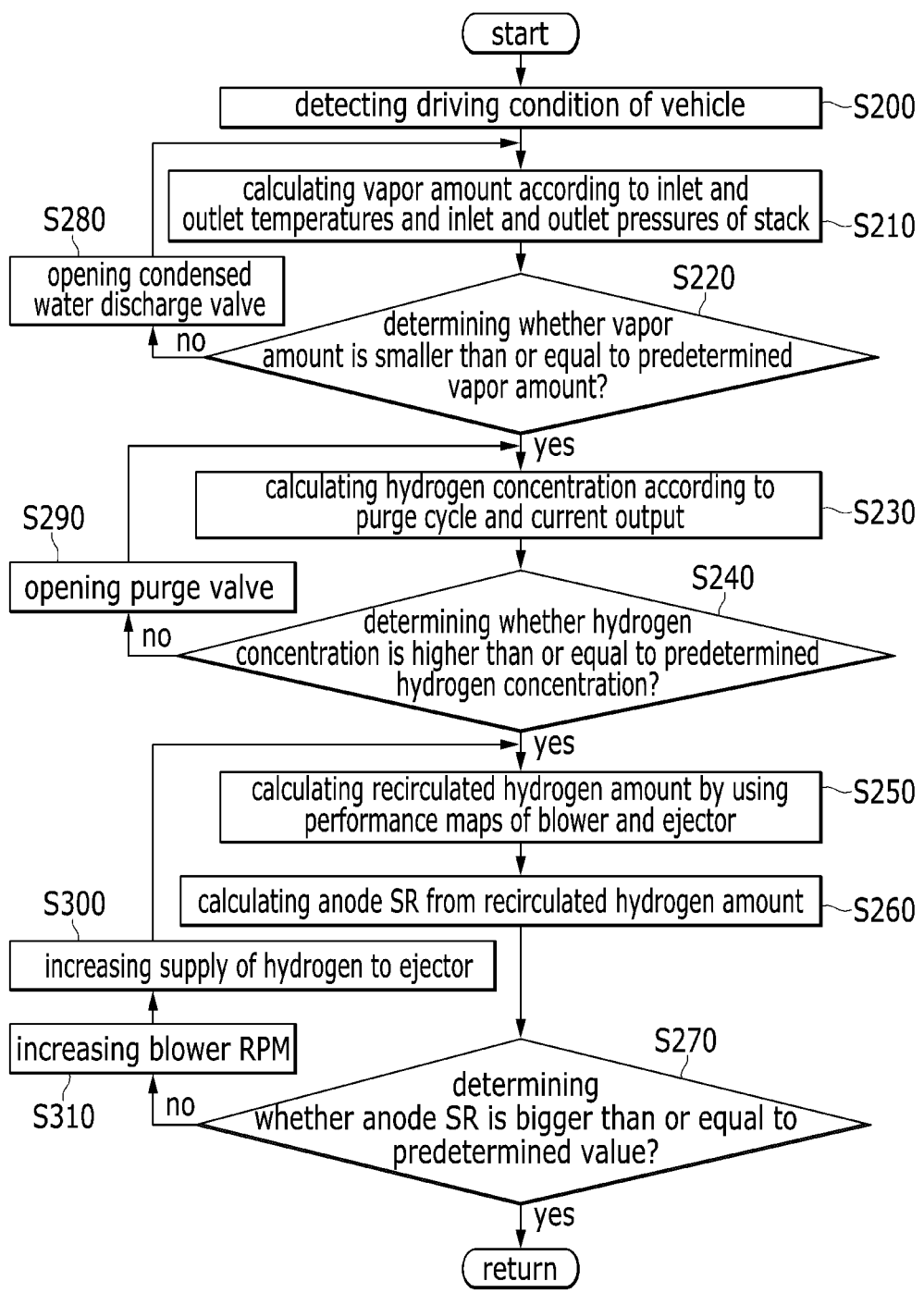
FIG. 3 is a flowchart of a method for controlling a fuel cell system for vehicles according to an exemplary embodiment of the present invention.

As shown in FIG. 3, the method for controlling the fuel cell system for vehicles begins by detecting the driving condition of the vehicle at step S200. The driving condition of the vehicle includes, for example, the inlet and outlet temperatures of the stack 30, the inlet and outlet pressures of the stack 30, the rotation speed of the blower 50, and the current output of the stack 30.

The control portion 170 then calculates a vapor amount according to the driving condition of the vehicle at step S210. The vapor amount W[%] according to the driving condition of the vehicle can be calculated from Equation 1.

$$W[\%] = f(T1, T2, P1, P2) \quad \text{(Equation 1)}$$

Herein, T1 denotes the inlet temperature of the stack 30, T2 denotes the outlet temperature of the stack 30, P1 denotes the inlet pressure of the stack 30, and P2 denotes the outlet pressure of the stack 30. As such, if the inlet and outlet temperatures and the inlet and outlet pressures of the stack 30 are known, the vapor amount can be provided by the ideal gas equation or by experimental values.

After the vapor amount is calculated, the control portion 170 determines whether the calculated vapor amount is smaller than or equal to a predetermined vapor amount at step S220. The predetermined vapor amount, for example, may be 15% or any other suitable amount which can be determined by one of skill in the art.

If the vapor amount in the stack 30 is higher than the predetermined vapor amount, then it is difficult for the oxidation-reduction reaction in the stack 30 to occur. Therefore, if the calculated vapor amount is higher than the predetermined vapor amount, then the control portion 170 opens the condensed water discharge valve 82 so as to discharge the condensed water in the stack 30 at step S280, thereafter, the control portion 170 returns to step S210.

At this time, if the vapor amount in the stack 30 is smaller than or equal to the predetermined vapor amount at step S220, then the control portion 170 calculates the hydrogen concentration according to the driving conditions of the vehicle at step S230. The hydrogen concentration H[%] according to the driving condition of the vehicle can be calculated from Equation 2.

$$H[\%] = f(T\text{purge}, \Sigma C) \quad \text{(Equation 2)}$$

wherein, Tpurge denotes the purge cycle, and C denotes the current output of the stack 30.

As described above, if the nitrogen moves from the cathode to the anode, the hydrogen concentration is reduced. In addition, if the purge valve 80 opened, the nitrogen concentration is reduced and the hydrogen concentration increases. Further, the nitrogen concentration of the anode relates to the hydrogen used in the stack 30. As such, the hydrogen concentration in the stack 30 is related to (as shown in Equation 2) the purge cycle and the current output of the stack 30. Thus, Equation 2 may be obtained by experimentation.

If the hydrogen concentration is calculated at step S230, the control portion 170 determines whether the hydrogen concentration in the stack 30 is higher than or equal to a predetermined hydrogen concentration at a step S240. The predetermined hydrogen concentration may be 80%, or any other suitable amount which can be determined by one of skill in the art.

If the hydrogen concentration in the stack 30 is lower than the predetermined hydrogen concentration, the nitrogen concentration in the stack 30 is high and it is difficult for the oxidation-reduction reaction to occur. In this case, the control portion 170 can opens the purge valve 80 so as to exhaust the impurities (e.g., nitrogen and water) in the stack 30, and then return to steps S290 and S230.

Figure 4:
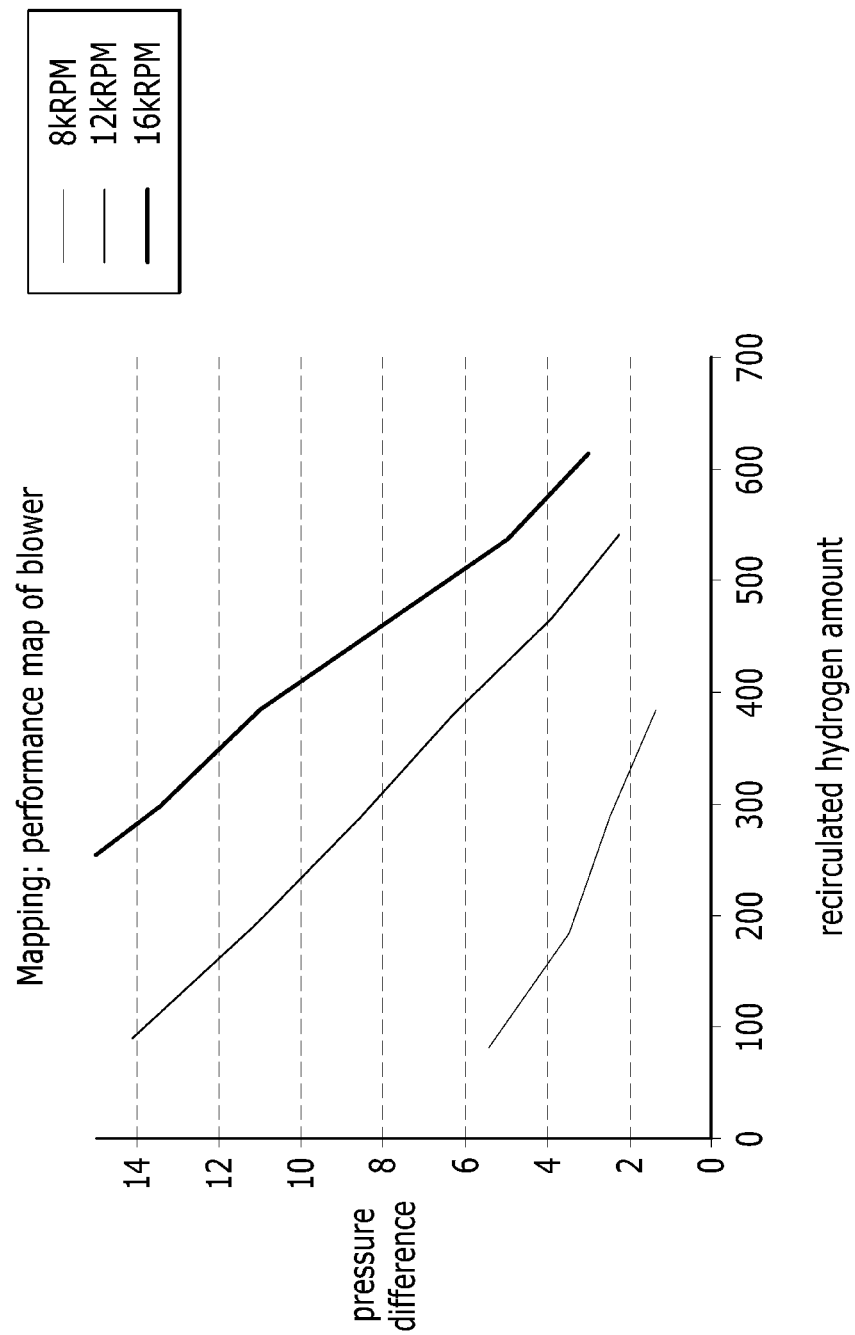
FIG. 4 shows one example of a blower performance map used in a method for controlling a fuel cell system for vehicles according to an exemplary embodiment of the present invention.

If the hydrogen concentration in the stack 30 is higher than or equal to the predetermined hydrogen concentration at step S240, then the control portion 170 can calculate the recirculated hydrogen amount by using the performance maps of the blower 50 and the ejector 60 at step S250. Step S250 will be described in further detail in connection with FIG. 4, which shows the recirculated hydrogen amount according to the rotation speed of the blower 50 and a pressure difference between the inlet and the outlet of the stack 30, which is determined by running experiments and gathering data so as to generate a blower performance map. For example, FIG. 4 shows one example of a blower performance map. Of course, this is only one example, and the blower performance map is not limited to the one shown in FIG. 4. In particular, the blower performance map may be produced according to the inlet and outlet temperatures of the stack 30, a composition ratio of the gas (i.e., composition ratios of hydrogen/nitrogen/vapor) as well as the rotation speed of the blower 50 and the pressure difference between the inlet and the outlet of the stack 30.

If the blower performance map is produced, the recirculated hydrogen amount by the blower 50 is functionalized as Equation 3.

$$Q[rec,H2,HRB]=f\{H[\%],T2,P1,P2,RPM\} \quad \text{(Equation 3)}$$

wherein, Q[rec, H2, HRB] denotes the recirculated hydrogen amount by the blower 50, and an RPM denotes the rotation speed of the blower 50.

If the driving condition of the vehicle detected at step S200 is input into Equation 3, then the recirculated hydrogen amount by the blower 50 can be calculated.

Similarly, the recirculated hydrogen amount by the ejector 60 can be calculated as follows.

Figure 5:
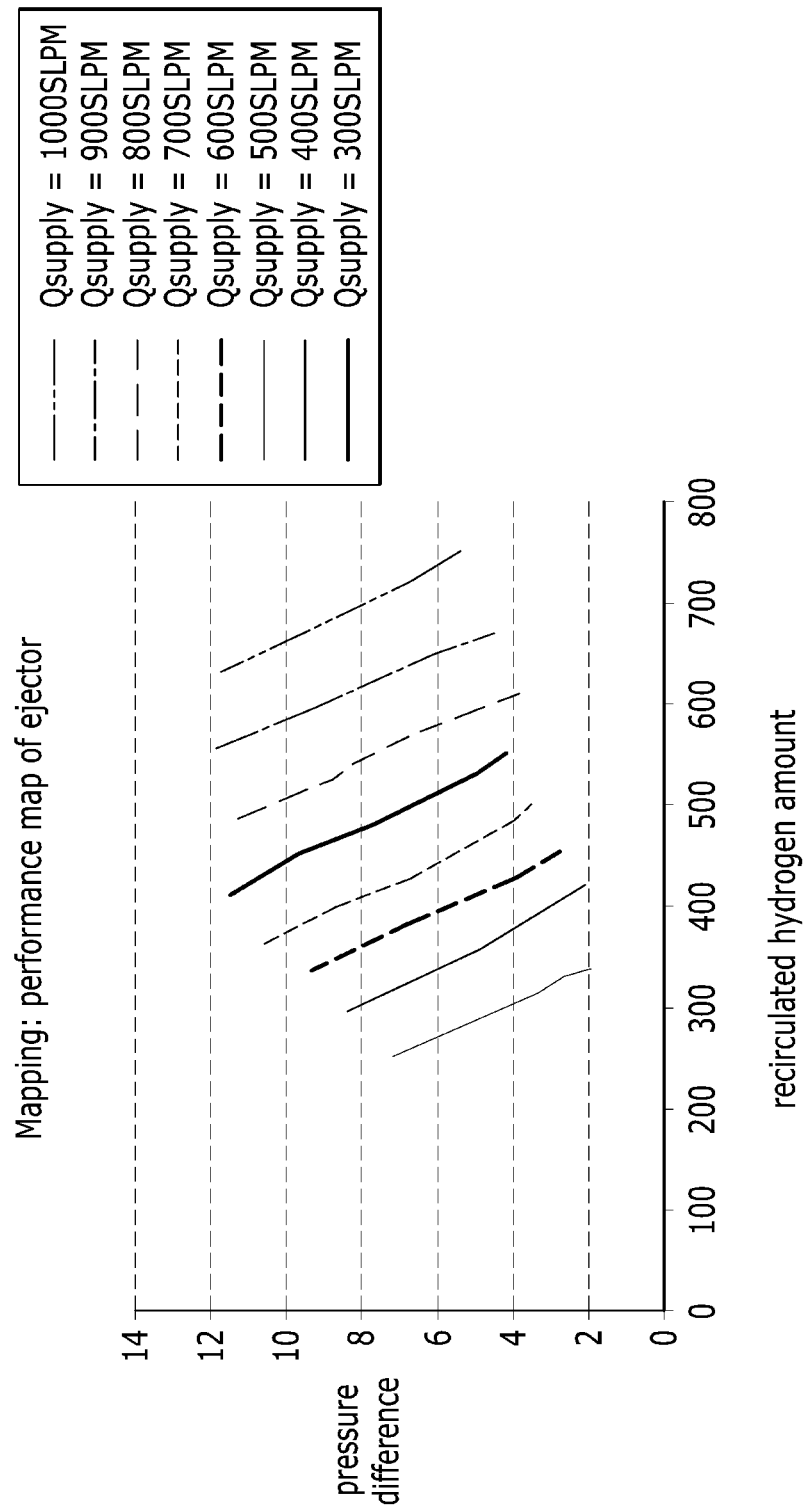
FIG. 5 shows one example of an ejector performance map used in a method for controlling a fuel cell system for vehicles according to an exemplary embodiment of the present invention.

As shown in FIG. 5, the recirculated hydrogen amount according to the hydrogen amount supplied to the ejector 60 and the pressure difference between the inlet and the outlet of the stack 30 is detected by performing a number of experiments, gathering the experimental data, and producing an ejector performance map. FIG. 5 shows one example of an ejector performance map. Of course, this is only one example, and the ejector performance map is not limited to the one shown in FIG. 5. The ejector performance map may be produced according to the inlet and outlet temperatures of the stack 30, a composition ratio of the gas (i.e., composition ratios of hydrogen/nitrogen/vapor) as well as the hydrogen amount supplied to the ejector 60 and the pressure difference between the inlet and the outlet of the stack 30.

If the ejector performance map is produced, the recirculated hydrogen amount by the ejector 60 is functionalized as Equation 4.

$$Q[rec,H2,Ejector]=f\{Hs,H[\%],T2,P1,P2\} \quad \text{(Equation 4)}$$

wherein, Q[rec, H2, Ejector] denotes the recirculated hydrogen amount by the ejector 60, and Hs denotes the hydrogen amount supplied to the ejector 60.

If the driving condition of the vehicle detected at step S200 is input into Equation 4, the recirculated hydrogen amount by the ejector 60 can be calculated.

If the recirculated hydrogen amount by the blower 50 and the ejector 60 is calculated, the control portion 170 can then calculate an SR (Stoichiometric Ratio) of the hydrogen in the stack 30 (particularly, anode) at step S260. Hereinafter, the SR of the hydrogen in the anode will be referred to as an anode SR. The anode SR can be calculated from Equation 5 and Equation 6.

$$Q[rec,H2]=Q[rec,H2,HRB]+Q[rec,H2,Ejector] \quad \text{(Equation 5)}$$

$$\text{anode } SR=\{Q[H2,\text{Supply}]+Q[rec,H2]\}/Q[H2,\text{Supply}] \quad \text{(Equation 6)}$$

wherein, Q[rec, H2] denotes a total hydrogen amount recirculated to the stack 30, and Q[H2, Supply] denotes the hydrogen amount supplied from the hydrogen storage 20.

If the anode SR is calculated, the control portion 170 can determines whether the anode SR is bigger than or equal to a predetermined value at step S270. The predetermined value may be 1.5, or any other suitable value which can be determined by one of skill in the art.

If the anode SR is smaller than the predetermined value, then the control portion 170 controls the blower 50 and the ejector 60 to increase the recirculated hydrogen amount to the stack 30 because the recirculated hydrogen amount to the stack 30 is small. In particular, the control portion 170 can increase the rotation speed of the blower 50 at step S310 and increase the hydrogen amount supplied to the ejector 60 at step S300. The control portion 170 may perform both step S300 and step S310, or may perform any one of step S300 and step S310.

If the anode SR is bigger than or equal to the predetermined value at step S270, then the control portion 170 repeats the method for controlling the fuel cell system for vehicles according to the exemplary embodiment of the present invention from the beginning.

It is noted that the present method is not limited to the exemplary embodiment of the present invention, for example, in the order as described above.

FIG. 6 is a graph showing a recirculated hydrogen amount, an anode SR, and a current in a case that a method for controlling a fuel cell system for vehicles according to an exemplary embodiment of the present invention is used.

As shown in FIG. 6, the recirculated hydrogen amount is reduced if a load (current) of the vehicle is reduced, and the recirculated hydrogen amount increases if the load (current) of the vehicle increases. This shows that the recirculated hydrogen amount is suitably managed according to a load change of the vehicle.

As described above, pressure values having quick responsiveness can be used for predicting a recirculated hydrogen amount, and, thus, prediction of the recirculated hydrogen amount has high reliability according to the present invention.

Further, according to the present invention, since a constant amount of hydrogen can be reliably recirculated by precisely predicting the recirculated hydrogen amount, output of a stack may be maintained to be constant.

Further, since a blower, an ejector, a condensed water discharge valve, and a purge valve can be suitably controlled so as to increase the recirculated hydrogen amount, performance of a fuel cell system may be improved in accordance with the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel cell system for vehicles comprising:
   a stack comprising a plurality of unit cells for generating electrical energy by electrochemical reaction of a fuel and an oxidizing agent;
   a blower configured to recirculate a gas exhausted from the stack so as to supply the gas back to the stack;
   an ejector configured to recirculate the gas exhausted from the stack, receive hydrogen so as to mix the hydrogen with the gas recirculated, and supply a mixture of the hydrogen and the gas to the stack;
   a sensor module configured to detect a driving condition of the vehicle; and
   a control portion configured to control operations of the blower and the ejector based on the driving condition of the vehicle and performance maps of the blower and the ejector,
   wherein a first recirculated hydrogen amount according to a pressure difference between an inlet and an outlet of the stack and a blower RPM is stored in the performance map of the blower, and a second recirculated hydrogen amount according to the pressure difference between the inlet and the outlet of the stack and a hydrogen amount supplied to the ejector is stored in the performance map of the ejector.

2. The fuel cell system of claim 1, further comprising a purge valve configured to discharge impurities in the stack and to open and close based on a hydrogen concentration calculated according to the driving condition of the vehicle.

3. The fuel cell system of claim 1, further comprising a condensed water discharge valve configured to discharge condensed water in the stack and to open and close based on a vapor amount calculated according to the driving condition of the vehicle.

4. The fuel cell system of claim 1, wherein the sensor module comprises:
   a first temperature sensor configured to detect an inlet temperature of the stack;
   a second temperature sensor configured to detect an outlet temperature of the stack;
   a first pressure sensor configured to detect an inlet pressure of the stack;
   a second pressure sensor configured to detect an outlet pressure of the stack;
   an RPM sensor configured to detect the blower RPM; and
   an ammeter configured to detect a current output from the stack.

* * * * *